(12) United States Patent
Lucas et al.

(10) Patent No.: US 11,752,481 B2
(45) Date of Patent: Sep. 12, 2023

(54) REACTOR FOR PRODUCING A SYNTHESIS GAS FROM A FUEL

(71) Applicant: MILENA-OLGA Joint Innovation Assets B.V., Maassluis (NL)

(72) Inventors: Janja Arjan Lucas, Leiden (NL); Robin Willem Rudolf Zwart, Maassluis (NL)

(73) Assignee: MILENA-OLGA Joint Innovation Assets B.V., Maassluis (NL)

( * ) Notice: Subject to any disclaimer, the term of this patent is extended or adjusted under 35 U.S.C. 154(b) by 337 days.

(21) Appl. No.: 17/279,635

(22) PCT Filed: Oct. 1, 2019

(86) PCT No.: PCT/NL2019/050656
§ 371 (c)(1),
(2) Date: Mar. 25, 2021

(87) PCT Pub. No.: WO2020/071908
PCT Pub. Date: Apr. 9, 2020

(65) Prior Publication Data
US 2021/0339216 A1    Nov. 4, 2021

(30) Foreign Application Priority Data

Oct. 1, 2018  (NL) ..................................... 2021739

(51) Int. Cl.
*B01J 8/18*     (2006.01)
*B01J 8/08*     (2006.01)
(Continued)

(52) U.S. Cl.
CPC ................. *B01J 8/26* (2013.01); *B01J 8/085* (2013.01); *B01J 8/1827* (2013.01); *C10J 3/482* (2013.01);
(Continued)

(58) Field of Classification Search
CPC ... B01J 8/26; B01J 8/085; B01J 8/1827; B01J 2208/00707; B01J 2208/00761;
(Continued)

(56) References Cited

U.S. PATENT DOCUMENTS 3,776,150 A    12/1973   Evans et al.
3,959,117 A    5/1976    Bunn, Jr. et al.

FOREIGN PATENT DOCUMENTS

GB    2077614 A      12/1981
RU    2580738 C1     4/2016
(Continued)

*Primary Examiner* — Huy Tram Nguyen
(74) *Attorney, Agent, or Firm* — N.V. Nederlandsch Octrooibureau

(57) ABSTRACT

A reactor for producing a synthesis gas from a fuel, with a housing (2) with a combustion part accommodating a first fluidized bed in operation, a riser (3) extending along a longitudinal direction of the reactor (1) and accommodating a second fluidized bed in operation, a down-comer (4) positioned parallel to the riser and extending into the first fluidized bed, and one or more feed channels (33) for providing the fuel to the reactor (1). The reactor (1) further has a riser air chamber section (B) connected to a lower part of the riser (3), the riser air chamber section (B) comprising a cylindrical wall (28) with a plurality of circumferentially located holes (24, 25).

18 Claims, 4 Drawing Sheets

(51) Int. Cl.
*B01J 8/26* (2006.01)
*C10J 3/48* (2006.01)
*C10J 3/74* (2006.01)

(52) U.S. Cl.
CPC ........ *C10J 3/74* (2013.01); *B01J 2208/00707* (2013.01); *B01J 2208/00761* (2013.01); *B01J 2208/00893* (2013.01); *B01J 2208/00991* (2013.01); *C10J 2200/152* (2013.01); *C10J 2300/0916* (2013.01); *C10J 2300/0946* (2013.01); *C10J 2300/0993* (2013.01); *C10J 2300/1807* (2013.01)

(58) Field of Classification Search
CPC .... B01J 2208/00893; B01J 2208/00991; C10J 3/482; C10J 3/74; C10J 2200/152; C10J 2300/0916; C10J 2300/0946; C10J 2300/0993; C10J 2300/1807; F23G 2900/50204; F23G 5/30; B09C 1/06; F23C 10/005; F23C 10/20
USPC ....................................................... 422/142
See application file for complete search history.

(56) References Cited

FOREIGN PATENT DOCUMENTS

| RU | 169609 U1 | 3/2017 |
|----|-----------|--------|
| WO | 9421962 A1 | 9/1994 |
| WO | 2008/108644 A1 | 9/2008 |
| WO | 2014/070001 A1 | 5/2014 |

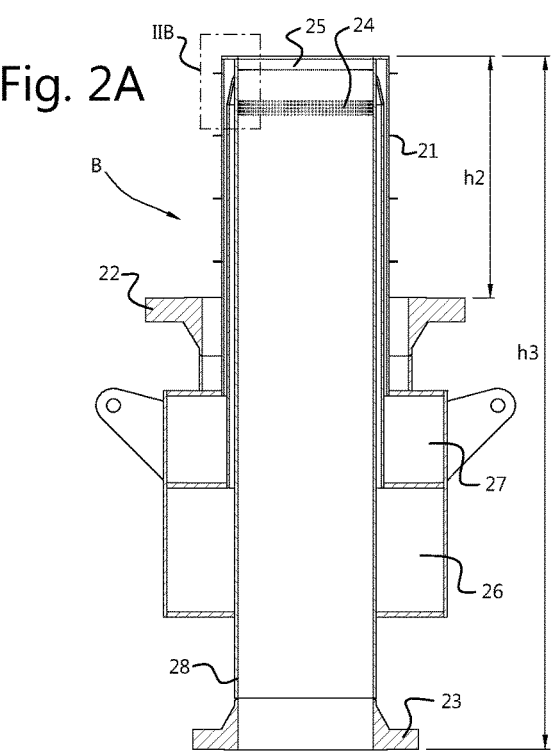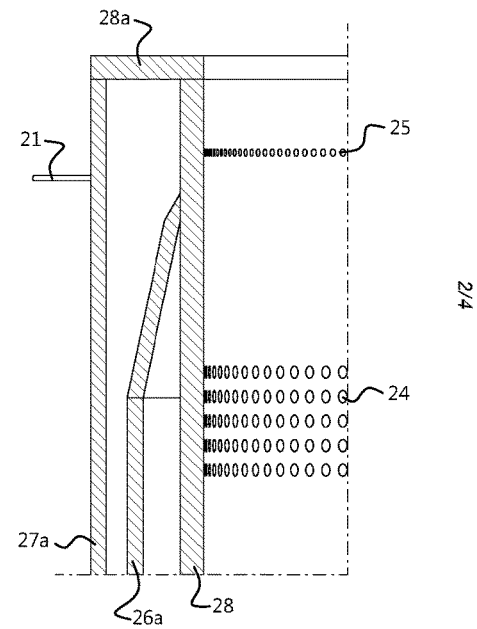

REACTOR FOR PRODUCING A SYNTHESIS GAS FROM A FUEL

FIELD OF THE INVENTION

The present invention relates to a reactor for producing a synthesis gas from a fuel, comprising a housing with a combustion part accommodating a first fluidized bed in operation, a riser extending along a longitudinal direction of the reactor and accommodating a second fluidized bed in operation, a down-comer positioned parallel to the riser and extending into the first fluidized bed, and one or more feed channels for providing the fuel to the reactor.

BACKGROUND ART

In known reactors of the type with an internal circulating fluidized bed system, usually problems occur when scaling the reactor from the size of a process development unit to a commercially operating unit. Additionally, the feedstock flexibility as proclaimed that can be used in known reactors cannot be assured, predominantly as of shortcomings in ash extraction when continuously required (such as when using waste feedstocks or feedstocks with high agglomeration potential or with high inert content).

International patent publication WO2014/070001 describes a reactor for producing a product gas from a fuel (biomass) having a housing with a combustion part accommodating a fluidized bed in operation, a riser extending along a longitudinal direction of the reactor, and a down-comer positioned coaxially around the riser and extending into the fluidized bed.

US patent publication U.S. Pat. No. 3,776,150 discloses a fluidized bed system for pyrolysis or incineration of solid wastes. The solids feed is force fed into a fluidized bed apparatus having a conically shaped distributor plate and a first internal chamber above the distributor plate and a smaller second internal chamber connected to the first chamber and positioned directly below the first chamber.

International patent publication WO2007/061301 describes a device for producing a product gas from biomass comprising at least one riser for the conversion of biomass to a product gas and a solids substance. The solids substance settles in the top of the reactor and falls into the outer combustion chamber via one or more down-comers. As at least one nozzle for the injection of a fluidization gas is attached in the riser, as a result the riser at the bottom is not free of obstructions.

International patent publication WO2008/108644 describes an improvement to the device disclosed in WO2007/061301, though still discloses the presence of at least one nozzle injecting a fluidizing fluid in or under the riser, thus partially blocking the extraction of bed material from the riser.

European patent publication EP-A-0 844 021 describes a reactor for catalytic conversion of organic substances using an internal circulating fluid bed reactor, where also a distributor is described above the central fluidized bed. Here, though, the distributor is referred to as a baffle, causing only separation of catalyst particles from the gas.

SUMMARY OF THE INVENTION

The present invention seeks to provide an improved reactor for producing a synthesis gas from a fuel, which is reliable and endurable, even when operated on fuels associated with a high number of contaminants ending up in the reactor. Contaminants that either are fuel bound like stones, metals and glass, or are the result of chemically reactions like agglomerates, and which require a higher extraction rate from the reactor. In other words, the present invention seeks to provide a solution to prevent fouling and/or plugging in a gasifier due to settling and/or bridging of inert materials and agglomerates. Furthermore, the present invention seeks to provide an improved reactor for producing a synthesis gas from a fuel, which is scalable, even when sized for several tens of tons per hour fuel feeding.

According to the present invention, a reactor according to the preamble defined above is provided, wherein the reactor further comprises a riser air chamber section connected to a lower part of the riser, the riser air chamber section comprising a cylindrical wall with a plurality of circumferentially located holes. This construction allows to use the circumferentially located holes as fluidization nozzles implementing the second fluidized bed during operation, and allows unrestricted movement of bed material (sand) in the second fluidized bed, greatly improving operational efficiency of the present reactor. As the fluidization medium (e.g. air) is being supplied from the side into the riser, this construction as such is not blocking or partially blocking the ash extraction from the riser. This furthermore assures that during operation the ashes and associated heavier inert materials can be extracted from the reactor without the risk of bridging and blockage of the bottom outlet of the reactor.

It is noted that in the present invention reactor embodiments, multiple risers may be present, in combination with one or more down-comers. Also, a down-comer may be provided coaxially to an associated riser, or as a separate (lengthwise aligned) down-comer channel. This further enhances the scalability of the present invention reactor embodiments.

Further advantageous embodiments of the present invention reactor are described by the attached dependent claims.

SHORT DESCRIPTION OF DRAWINGS

The present invention will be discussed in more detail below, with reference to the attached drawings, in which FIG. 1 shows a cross sectional view of a reactor according to an embodiment of the present invention;

FIG. 2A shows a cross sectional view of a riser air chamber section of the reactor embodiment shown in FIG. 1;

FIG. 2B shows a detail view of a top corner of the riser air chamber section shown in FIG. 2A;

DESCRIPTION OF EMBODIMENTS

Figure 1:
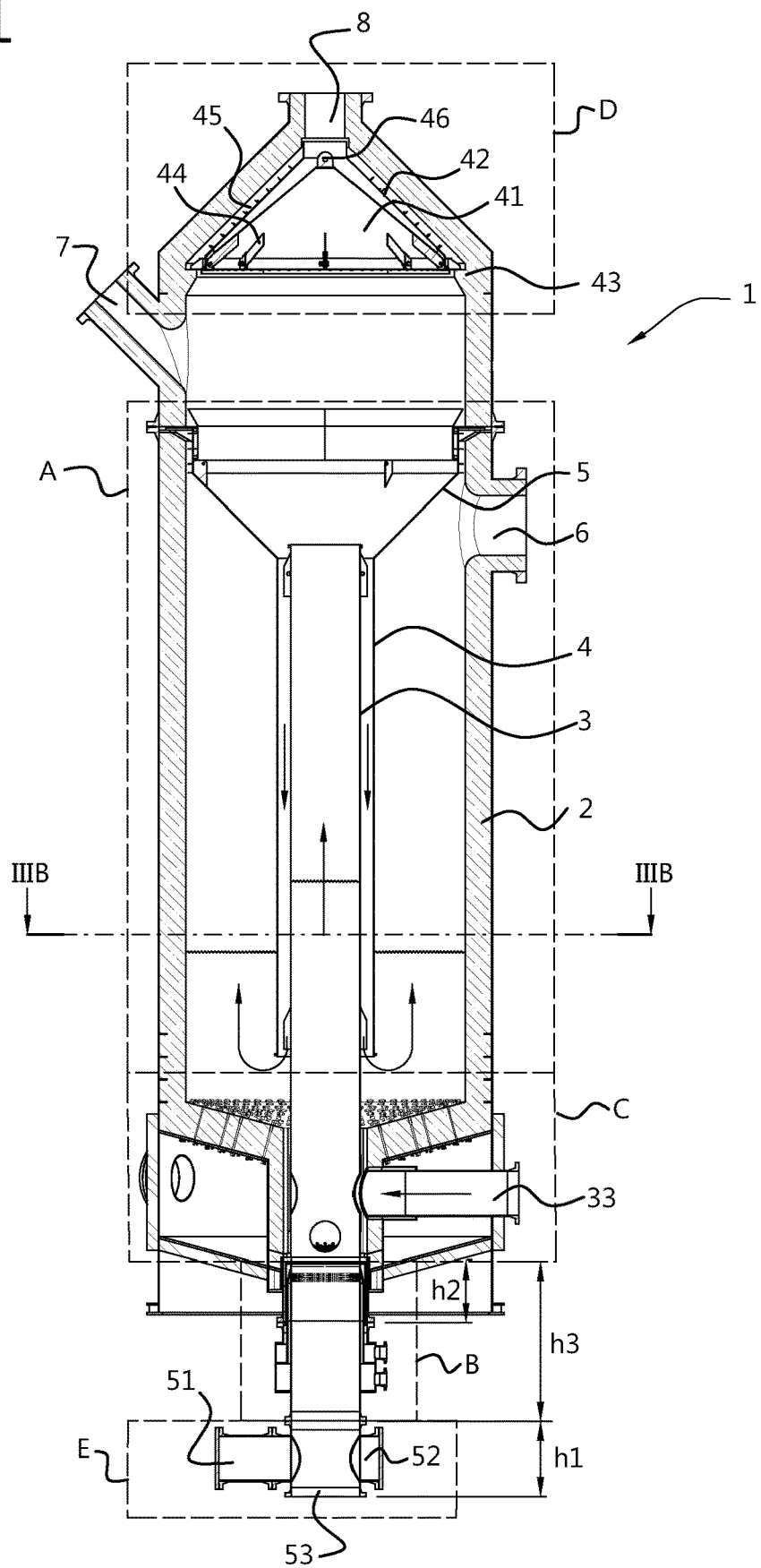

The present invention is described below with reference to an exemplary embodiment of a reactor for producing a synthesis gas from a fuel as shown in the drawings. It is however noted that parts of the reactor may be implemented using further alternatives and modifications as also indicated in the description below. The reactor 1 according to the present invention is utilized to transform a fuel into a synthesis gas, which can be further used. The fuel can be a biomass product, or waste of various constitution, and the synthesis gas output from the reactor 1 can be further synthesized to other products or directly used in e.g. a gas powered electrical generator or heating applications.

FIG. 1 shows a cross sectional view of a reactor 1 according to an exemplary embodiment of the present invention, having various sections. Indicated with roman I is the main section of the reactor 1 where pyrolysis and combustions processes are occurring during operation in a first and second fluidized bed. This main section A comprises a housing 2 with a combustion part accommodating a first fluidized bed in operation, a riser 3 extending along a longitudinal direction of the reactor 1 and accommodating a second fluidized bed in operation, and a down-comer 4 positioned parallel to the riser 3 and extending into the first fluidized bed. At the bottom of the housing 2, a bottom section C is indicated, which comprises the structural and functional elements to provide the first and second fluidized bed during operation, and which will be explained in further detail below. In this bottom section C, e.g. one or more feed channels 33 are present for providing the fuel to the reactor 1, e.g. to the riser 3. Flue gas generated in the first fluidized bed can exit from the reactor via combustion flue gas outlet 6, positioned in a top part of the reactor 1 as shown in the embodiment of FIG. 1.

Below the main section A, a riser air chamber II is positioned, which is arranged to provide control of the second fluidized bed inside the riser 3. Details of the riser air chamber II are discussed below with reference to FIGS. 2A and 2B. Below the riser air chamber II, a riser spool pipe section E is positioned, which is operative to allow extraction of ashes and bed material from the bottom of the reactor 1 (e.g. using a large screw or auger type of installation below, not shown in FIG. 1).

Above the main section A, a gas outlet distributor section D is provided, which ensures proper extraction of the generated synthesis gas from the reactor 1 via synthesis gas outlet 8. In the exemplary embodiment shown in FIG. 1, a pressure relief outlet 7 is present at the top part of the reactor 1 just below the gas outlet distributor section D. During normal operation the pressure relief outlet 7 is closed off, e.g. using a safety valve. Details of the gas outlet distributor section D are discussed further below.

During operation, (quite similar to earlier versions of the reactor 1 as described in PCT publications WO2007/061301 and WO2008/108644, which are incorporated herein by reference) fuel in the form of feedstock is fed into the riser 3 via fuel input 33, to enter into the second fluidized bed inside the riser 3. The feedstock is gasified in the second fluidized bed, entraining the bed material out of the riser 3 into the top section of the reactor 1, where particulates settle as of the reduced gas velocity and drop down into the down-comer 4 (e.g. via the funnel part 5 shown in the embodiment of FIG. 1) to end up in the first fluidized bed in the fluidized combustion section within the housing 2, as indicated by the arrows in FIG. 1. The synthesis gas produced by the gasification process is leaving the reactor 1 via the gas outlet distributor section D (e.g. via the synthesis gas outlet 8 shown in the FIG. 1 embodiment).

It is noted that the exemplary embodiment of the reactor 1 has a single, centrally located riser 3, and a single down-comer 4 positioned coaxially (or concentrically) to the riser 3. For larger scale reactors 1 it is envisaged that more than one riser 3 is present, as well as more than one down-comer 4 (even independent from the number of risers 3). Also, risers 3 and down-comers 4 can be positioned coaxially, but can also be positioned next to each other. Also, only a single feed channel 33 is shown in the embodiment of FIG. 1, directed generally perpendicular to a lengthwise direction of the riser 3. In further alternative embodiments, multiple feed channels 33 can be present, e.g. to enter feedstock from two or more sides, or at different heights in the riser 3.

Hot bed material present in the combustion zone (i.e. the first fluidized bed) is (partially) transported via two drop-zones in a bottom part of the combustion zone, e.g. at 90° rotation compared to the feed channel 33, into the bottom part of the riser 3. In further exemplary embodiments, one or more drop-zones are present. The hot bed material thus recirculated ensures gasification of the feedstock in the riser 3.

In existing gasification reactors, components like fluidization nozzles are present within the riser 3. As a result, no continuous ash extraction is possible, or at least hampered. When using clean biomass as fuel, this is not necessarily a problem, as most ashes would leave the reactor 1 via the flue gas outlet 6 and no high quantities of inert materials or agglomerates will be created. Then it is also possible to use a single fluidization nozzle in a bottom part of the riser 3 both during normal operation (small gas flow only needed for fluidizing the second fluidized bed in the riser 3) as well as during start-up operation (high gas flow to kick start the internal circulation of the bed material in the reactor 1).

However, when using feedstock with a high content of inert materials like rocks, metals and glass (like in waste) or handling feedstock with high melting risks forming agglomerates (like grass), this convention positioning of a fluidization nozzle inside the riser 3 restricts and complicates a desired extraction of ashes.

Also, the single fluidization nozzle operating at different gas flows resulted in a compromise in design as during normal operation with low gas flow the velocities through the nozzle could be too low causing back-flow of bed material in the air chamber connected to the fluidization nozzle. During start-up with high flow the velocities through the fluidization nozzle were (too) high causing high pressure drops and erosion.

It was found that the need for more continuous ash extraction also from the bottom part of the reactor 1 was needed. However, this resulted in the disappearance of the static bed in the bottom of the reactor 1 (below the fluidization nozzles), which in turn required a different insulation design as well as the use of different materials in the ash extraction zone.

Furthermore, it was found that more frequent use of these more complicated feedstocks resulted in a lot of maintenance issues needing long downtimes as removal of the inert materials and agglomerates was complex due to the lack of accessibility of the reactor 1 at convenient locations thereof.

To address these issues the present invention embodiments have been devised, which in a first embodiment relates to a reactor for producing a synthesis gas from a fuel, comprising a housing 2 with a combustion part accommodating a first fluidized bed in operation, a riser 3 extending along a longitudinal direction of the reactor 1 and accommodating a second fluidized bed in operation, a down-comer 4 positioned parallel to the riser and extending into the first fluidized bed, and one or more feed channels 33 for providing the fuel to the riser 3. The reactor 1 further comprises a riser air chamber section B connected to a lower part of the riser 3, the riser air chamber section B comprising a cylindrical wall 28 with a plurality of circumferentially located holes 24, 25.

In this embodiment, the ash extraction zone of the reactor 1 (i.e. from the riser 3 through riser air chamber section B and riser spool pipe section E) has no restrictions resulting from internal nozzles, as the fluidization medium (e.g. air at normal operation of the reactor 1) and the start-up medium (e.g. higher flow of air) are fed via the wall 28 of a nozzle pipe part of the riser air chamber II. The additional features present to deliver the medium to the circumferentially located holes 24, 25 can be integrated in the riser air chamber section B without restricting the ash extraction. It is noted that the cylindrical wall 28 is congruent with the bottom cross section of riser 3.

An exemplary embodiment of the riser air chamber section B, which in fact is a separate component allowing more efficient manufacturing and installation thereof, is shown in the cross sectional view of FIG. 2A and detail cross sectional view of FIG. 2B. The riser air chamber II comprises a top flange 22, allowing to mount the riser air chamber section B to a bottom flange of the reactor 1 in the bottom section C thereof. When installed, the top of cylindrical wall 28 then aligns with the bottom part of riser 3, leaving a small gap to accommodate possible differences in thermal expansion of the bottom part of riser 3 and top of cylindrical wall 28. A bottom flange 23 is present to extend the ash extraction zone to a top flange of the riser spool pipe section E.

In this embodiment, the riser air chamber section B comprises two sections of nozzle holes, an upper section with a first plurality of holes 25, and a lower section with a second plurality of holes 24, wherein a total aperture surface of the second plurality of holes 24 is larger than a total surface aperture of the first plurality of holes 25. This allows start-up operation of the reactor 1 with a high flow of air, and regular operation with a sufficient flow of air, while not restricting movement of sand in second fluidized bed. In other words, the fluidization nozzle for the second fluidized bed in the riser 3 has two sections of nozzle holes 24, 25, the upper section (first plurality of holes 25) being operative during normal operation when the amount of fluidization gas required is minimal, while the lower section (second plurality of holes 24) is only applied during start-up when the amount of fluidization gas required needs to be increased to start the internal circulation of bed material in the reactor 1. During start-up, the first plurality of holes 25 is also operative, in order to prevent clogging thereof when the second plurality of holes 24 are operative. This also has the effect that during start-up the pressure drop over the nozzles 24, 25 does not become too high, and during normal operation the velocities through the nozzles 24, 25 does not become too low. The nozzle holes 24, 25 for fluidization air (normal operation) and start-up air (start-up operation) are separated from each other with the fluidization air nozzles (first plurality of holes 25) being located above the start-up air nozzles (second plurality of holes 24). As such the nozzle holes 24, 25 can be designed for a typical gas velocity of 5-20 m/s, with the size and amount of the fluidization air nozzle holes 25 becoming independent from the size and amount of the start-up air nozzle holes 24.

As shown in the cross sectional views of FIGS. 2A and 2B, a fluidization air chamber 27 is provided in communication with the first plurality of holes 25, and furthermore, a start-up air chamber 26 is provided in communication with the second plurality of holes 24. It is noted that the fluidization air chamber 27 is embodied using a fluidization air chamber wall 27a positioned coaxial to the riser air chamber wall 28 in the top part of the riser air chamber section II (i.e. at and above the top flange 22). Similarly, the start-up air chamber 26 is embodied using a start-up air chamber wall 26a positioned coaxial to the riser air chamber wall 28 in the top part of the riser air chamber section B. Below the top flange it is then possible to make the fluidization air chamber 27 and start-up air chamber 26 wider, allowing further structural features to be added, such as (pressurized) air connections and/or inspection and maintenance hatches (as all air chambers 26, 27 are possibly subjected to the risk of backflow of bed material). Furthermore, this increase in diameter allows for a temperature difference and/or different thermal expansion between riser air chamber wall 28, start-up air chamber wall 26a and fluidization air chamber wall 27a.

During normal operation, only fluidization air is added to the reactor 1, and the bed material below the fluidization air nozzle holes (first plurality of holes 25) is not fluidized. As such, no bed material can be flowing backwards into the start-up air chamber 26 via the second plurality of holes 24. During start-up, both the fluidization air and the start-up air are added to the riser 3. The presence of fluidization air also during start-up avoids that bed material is flowing backwards into the fluidization air chamber 27 via the first plurality of holes 25.

The amount and size of the nozzles (first and second plurality of holes 24, 25) are based on the flow or air going through the nozzles, as well as an angle of repose of the bed material. This to achieve the effect that in case of no fluidization the static bed is not flowing backwards into the air chambers 26, 27. The angle of repose α of normally used bed material (sand) is e.g. approximately 35°, and therefore the diameter d of the nozzle holes is restricted to this angle of repose and the thickness t of the material of cylindrical wall 28, i.e. $d < t \tan \alpha$.

In an even further embodiment, the reactor 1 further comprises a riser spool pipe section E connected to a bottom part of the riser air chamber section B, as described above with reference to the embodiment shown in FIG. 1. This riser spool pipe section allows to inspect bed material below the second fluidized bed, and also to take out debris. Furthermore, safe maintenance to the nozzles 24, 25 can be done in case of eventual blockage of the ash extraction zone.

As shown in FIG. 1, the riser spool pipe section E comprises a bottom connection flange 53, as well as a long pipe 51 and a short pipe 52. The long pipe 51 is installed to allow access to this section E without bed material flowing freely out of the reactor 1 (again linked to angle of repose), the short pipe 52 would result in free flow of bed material out of the reactor 1 (e.g. if needed for maintenance).

In addition, by including the riser spool pipe section E, it is possible to remove this section E (by simply disconnecting the appropriate top and bottom flange), which then allows to lower the riser air chamber section B so that it is no longer positioned inside the bottom section C of the reactor 1. As such the accessibility of the riser 3 is increased, as it is no longer necessary to remove a (large) ash cooling screw installed in the bottom of the entire reactor 1 for the extraction of bed material. In a specific embodiment, the riser air chamber section B comprises an upper mounting flange 22 for connection to the housing 2, and a lower mounting flange 23 for connection to a corresponding mounting flange of the riser spool pipe section E, wherein a height $h_2$ of the cylindrical wall 28 extending above the upper mounting flange 22 is equal to or lower than a height $h_1$ of the riser spool pipe section E (see FIG. 1).

A further consideration taken into account for a further embodiment of the present invention is that, as the nozzles (or better the part of the cylindrical wall 28 surrounding the first and second plurality of holes 24, 25) become hot during operation it is necessary to account for thermal expansion. For this reason, insulation studs 21 are shown in the cross-sectional views of FIGS. 2A and 2B, onto which e.g. fibre material can be installed that allows for expansion while filling up gaps with other structural parts of the reactor 1 (e.g. the bottom part of the housing 2 where riser air chamber section B is mounted on using the upper flange 22). More generally, the riser air chamber section B further comprises compressible material attached to an outside surface thereof.

Figure 3A:
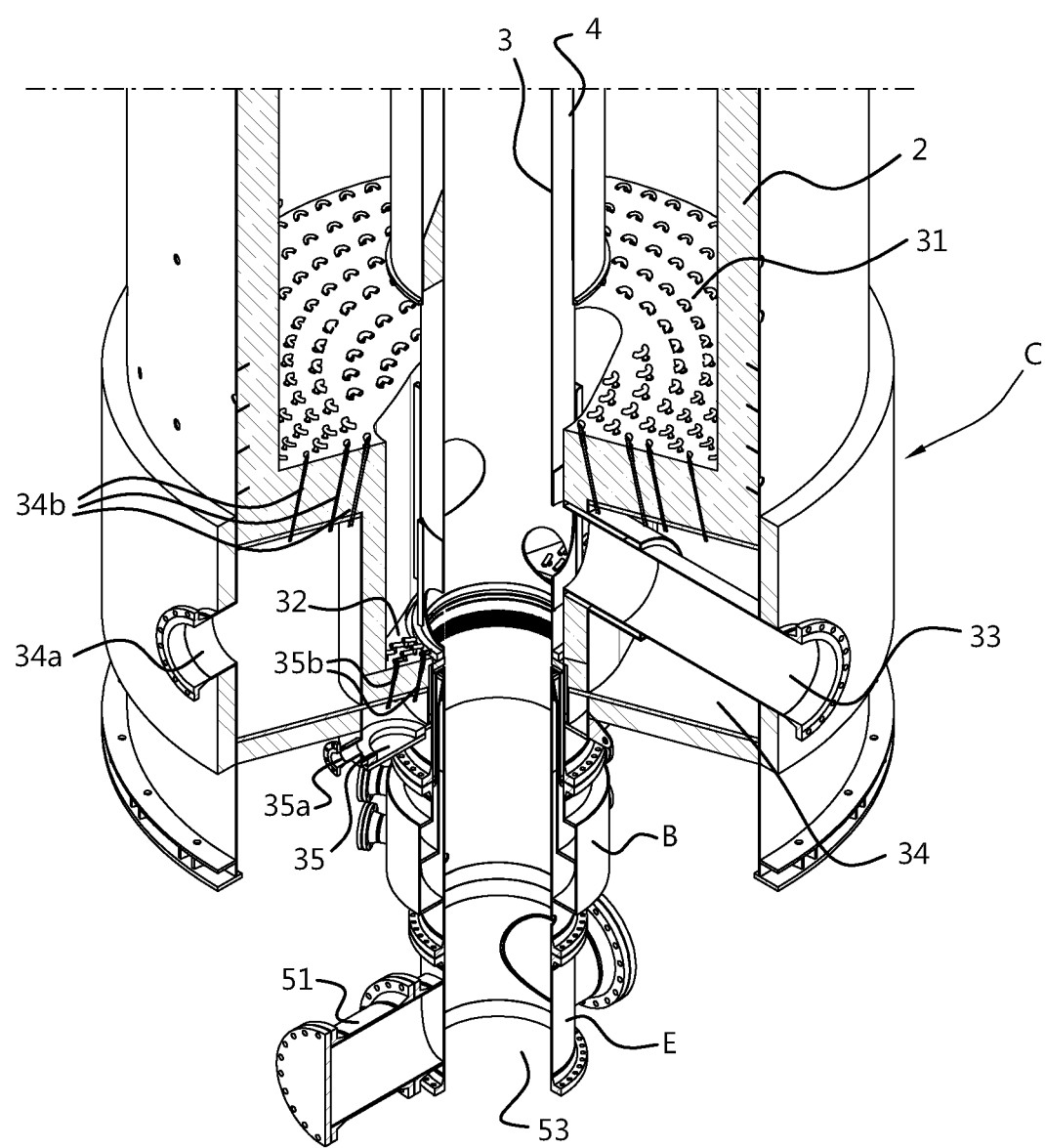
FIG. 3A shows a perspective, partial cross-sectional view of a part of the reactor embodiment shown in FIG. 1.

Further embodiments of the present invention include modifications and features relating to the first fluidized bed (within bottom section C of the reactor 1), which are described with reference to the partial cross sectional perspective view of FIG. 3A, the top cross sectional view along line IIIB-IIIB in FIG. 1 of FIG. 3B and the partial cross sectional view of FIG. 3C.

It is noted that some prior art gasification reactors of the fluidized bed type had a flat bottom of the fluidized bed both in a combustion zone as well as in a sand transport zone. The bottom was e.g. fully refractory lined with drop tubes to remove bed material, or a static bed was present below the fluidized bed, with some extraction funnels to remove bed material. Nozzles where not specifically directed, they only were intended to fluidize the bed material. The following problems were found for these prior art reactors. Because of the horizontal bottom of the fluidized bed, inert materials and agglomerates could not be easily removed from the reactor during operation, and especially when using waste feedstock as fuel, over time the inert materials would accumulate in the reactor. Also because of the horizontal bottom and absence of any guiding means (e.g. nozzles) in the transport zone, agglomerates kept on growing without being extracted from the reactor. Consequently at some point the agglomerates would be blocking the whole transport zone, as a result suddenly stopping the sand circulation and seizing gasification operation of the reactor.

To address these disadvantages additional features are provided in the bottom section C of the reactor. In general, in a further group of embodiments, a reactor is provided for producing a synthesis gas from a fuel, comprising a housing 2 with a combustion part accommodating a first fluidized bed in operation, a riser 3 extending along a longitudinal direction of the reactor 1 and accommodating a second fluidized bed in operation, a down-comer 4 positioned parallel to the riser and extending into the first fluidized bed, and one or more feed channels 33 for providing the fuel to the riser 3. The housing 2 comprises a first sloped, e.g. refractory lined, bottom 31 of the first fluidized bed, and a second sloped, e.g. refractory lined, bottom 32 in a transport zone connecting the first fluidized bed and the second fluidized bed through a transport aperture 39 in the riser 3. The reactor further comprises multiple groups of air nozzles 36, 37, 38 on the first sloped bottom 31 and second sloped bottom 32, the multiple groups of air nozzles 36, 37, 38 being arranged to direct air along the respective first and second sloped bottom 31, 32. Alternatively or additionally, the air directed along the sloped bottoms 31, 32 may be steam. These embodiments allow a controllable movement of sand and debris in the bottom section C, e.g. to recirculate bed material from the first fluidized bed to the second fluidized bed in the riser 3, or to extract ashes and debris (via the riser air chamber section B and riser spool pipe section E). A further advantageous effect is that it is possible to direct the multiple groups of air nozzles 36, 37, 38 away from sensitive parts of the reactor 1 (e.g. the wall of the riser 3, or specific openings in that wall), preventing erosion of the metal structure of the riser 3.

In a further embodiment, the first and second sloped bottom 31, 32 have a sloping angle of between 5°-35°, e.g. at 15° with respect to a cross sectional plane of the reactor 1. In an exemplary embodiment (see FIG. 3A-C), both the first bottom 31 of the first fluidized bed and the second bottom 32 in the transport zones towards the transport aperture 39 in the riser 3, are at a 15° slope easing the flow of the inert material and agglomerates towards the ash extraction zone in/below the riser 3. The slope is limited to be smaller than the angle of repose of the bed material as otherwise too much difference in bed level would result along the first fluidized bed.

Figure 3B:
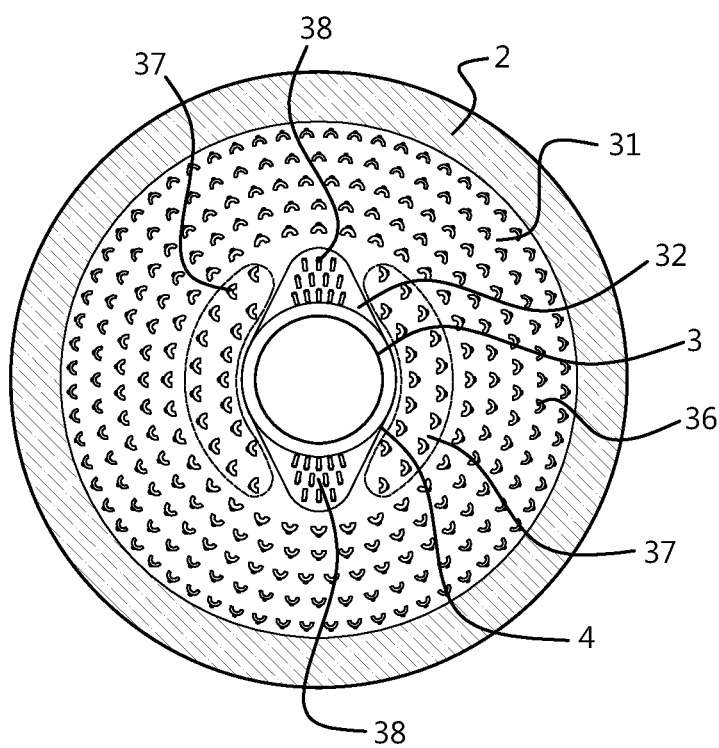
FIG. 3B shows a top cross-sectional view of the reactor embodiment shown in FIG. 1 along the lines IIIB-IIIB.
Figure 3C:
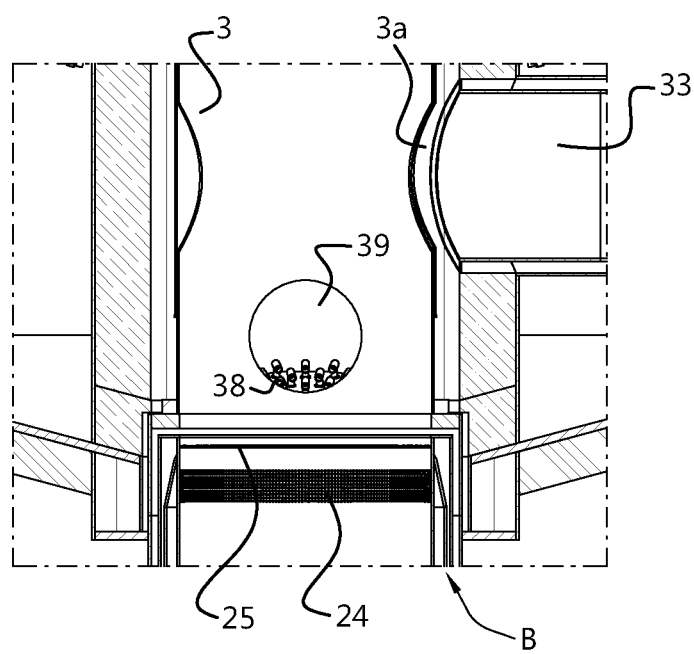
FIG. 3C shows a partial cross-sectional view of the riser and riser air chamber section part of the reactor embodiment shown in FIG. 1.

The bottom 31 of the first fluidized bed is e.g. equipped with nozzles 36, 37 of which the air outlet is directed towards a specific part of the reactor 1, which is shown in the top view of FIG. 3B. The multiple groups of air nozzles 36, 37, 38 may comprise a first group of air nozzles 36 on the first sloped bottom 31, of which nozzle flows are directed at the centre of the reactor 1. The first group of air nozzles 36, or outer primary air nozzles, may be radially oriented, e.g. using the shown elbow pipe configuration. Furthermore, the multiple groups of air nozzles 36, 37, 38 comprises a second group of air nozzles 37 on the first sloped bottom 31, of which nozzle flows are directed at the transport zone. The second group of air nozzles 37, or inner primary air nozzles, have a (mid plane) directional orientation towards the inner edge of the first sloped bottom 31, i.e. towards the transport zones leading to the transport aperture 39. This will ensure inert materials and agglomerates to be blown towards the transport zone. In all cases the individual nozzles are arranged to have an outlet flow which is not directly hitting any parts of the reactor (e.g. metal surfaces of riser 3, the refractory material on the first sloped bottom 31, or other nozzles in front).

In a further embodiment, the multiple groups of air nozzles 36, 37, 38 comprises a third group of air nozzles 38 on the second sloped bottom 32, of which nozzle flows are directed at the transport aperture 39 in the riser 3. The nozzles of the third group of nozzles 38 have an air outlet flow not directly hitting any parts of the reactor (e.g. metal surfaces of riser 3, the refractory material on the second sloped bottom 32, or other nozzles in front).

In an even further embodiment, the transport aperture 39 in the riser 3 is provided with a cover plate. Such a cover plate can have multiple functions, and e.g. not only allows the size of the transport aperture 39 to be modified during a maintenance stop by replacing the cover plate, but also allows protection of the metal of the riser 3 from severe erosion in the presence of inert materials and agglomerates. To that end the cover plate may be provided with a cover plate aperture, e.g. smaller than the transport aperture 39 in the riser 3.

The transport aperture 39 may be sized based on a desired pressure differential between the riser 3 and the first fluidized bed, which determines a velocity of bed material being transported. E.g. the transport aperture 39 (in the cover plate) may be dimensioned so that the amount of bed material being transported is 40 times the amount of feedstock fed into the reactor 1. This would create a temperature differential between the exothermic combustion in the first fluidized bed and endothermic pyrolysis in the second fluidized bed of ~70° C. By increasing the dimensions of the transport aperture 39 (which is limited by the size of the riser 3), the bed material transport can be ~60 times the amount of feedstock and the temperature difference will then be reduced to ~50° C. By decreasing the dimensions of the transport aperture 39, the bed material transport can be reduced. If reducing to ~20 times the amount of feedstock the temperature difference will be over 100° C. Hence the cover plate not only protects the metal of the riser 3 against unwanted erosion, but also allows for modifications and hence other operating conditions without the need to replace the entire riser 3.

Further embodiments of the present invention include modifications and features relating to the gas outlet distributor section D, which are described below with reference to the cross sectional view of FIG. 1. In general, in a further group of embodiments, a reactor 1 for producing a synthesis gas from a fuel is provided, comprising a housing 2 with a combustion part accommodating a first fluidized bed in operation, a riser 3 extending along a longitudinal direction of the reactor 1 and accommodating a second fluidized bed in operation, a down-comer 4 positioned parallel to the riser and extending into the first fluidized bed, and one or more feed channels 33 for providing the fuel to the riser 3. The reactor 1 further comprises a gas outlet distributor section D, the gas outlet distributor section D comprising an inner cone 41 and an outer cone 42 (which may be of the same material, e.g. metal), wherein the inner and outer cone have a different apex opening angle and form an outlet channel with a constant cross section as function of a height of the gas outlet distributor section D. The different apex opening angle ensures a constant gas speed over the entire outlet channel formed between inner and outer cone 41, 42. Furthermore, the shape of the inner cone 41 has the effect of an improved settlement of bed material and ashes, the inner and outer cone 41, 42 having the required distance between the cones 41, 42 at all operating temperatures (including e.g. during start-up and shut-down) assuring sufficient gas velocity during start-up as well as during normal operation.

The gas outlet distributor section D creates a narrow gap gas outlet channel starting near the top of the reactor 1. The narrow gap is designed to create a gas velocity of e.g. 20 m/s. As the inner cone 41 and outer cone 42 are getting smaller towards the synthetic gas outlet 8, but at a different apex opening angle, the gap is increasing to maintain the high gas velocity. The slope of the inner cone 41 again considers the angle of repose of the bed material, so that in case of no gas flow particles would have the tendency to flow backwards into the reactor interior.

These group of embodiments addresses a number of problems which were identified for existing reactor designs. In previous designs, a baffle was positioned above the riser 3, which functions differently from the present invention gas outlet distributor section D, creating high velocities in the gas outlet itself. As a result, velocities in the reactor 1 were too low, and the gas outlet suffered from plugging by settling dust and tars. In some prior art reactors, a gas outlet distributor was put closer to the refractory lining in the top part of the housing 2, however as the refractory lining material and the (metal) gas outlet distributor have different thermal expansion behavior it was complicated to come to the correct design and the performance was depending on the operating temperature of the reactor, as the gap varied with temperature.

In a further embodiment, the housing 2 comprises an inward extending ridge 43, e.g. of a refractory lining material, supporting a lower edge of the gas outlet distributor section D. The inward extending ridge 43 can be properly dimensioned to support a lower end of the outer cone 42, which provides an optional alternative to hanging an entire gas outlet distributor section D from a top part of the housing 2. As a result, the thermal expansion of the components of the gas outlet distributor section D will be upwards only, which is a manageable situation during operation of the reactor 1. Also, the synthesis gas outlet 8 is kept free of any possible interfering elements, such as a tripod hanging construction. This embodiment also greatly improves scalability of the reactor 1.

In an even further embodiment, expansion material 45 is provided on a surface of the outer cone 42 directed at a top part of the housing 2. As the thermal expansion is in a single direction, this embodiment allows for simple and effective solution to this thermal expansion issue.

As an optional element, the inner cone 41 comprises a lifting lug 46 at a top apex of the inner cone 41. If the diameter of the inner cone bottom end is properly chosen, this allows to lower the inner cone 41 separate from the outer cone 42, e.g. for cleaning of both the outer cone 42 and inner cone 41, e.g. to remove excessive fouling aggregated overtime during operation of the reactor 1. As a result, the gas outlet distributor section D can be maintained if necessary during a maintenance stop without the need to remove the complete top section of the housing 2 of reactor 1.

A further problem playing a role for this type of gasification reactors 1, is the possibility that the inner cone 41 (which is closed in the top) may suffer from erosion by the bed material and ashes blown out of the top end of the riser 3. To address this problem, in a further embodiment, the inner cone 41 of the gas outlet distributor section D is positioned in the reactor at a predetermined distance from a top edge of the riser 3. The predetermined distance is e.g. calculated based on a transport disengagement height (TDH) for a specific dimensioned reactor and other operating parameters such as type of feedstock, type of bed material, etc. The TDH is the point at which larger entrained particles that cause erosion of the gas outlet distributor by gravity fall below, while smaller harmless particles remain entrained and together with the gas leave the reactor via the gas outlet distributor.

It is noted that in the above description of an exemplary reactor embodiment, several features are described which provide beneficial effects in operating the reactor. Each of these features can be applied in isolation or in combination to provide even further enhanced operation of the reactor 1. An important aim of the present invention is the prevention of fouling/plugging of the existing gasifier design by settling and/or bridging of inert materials and agglomerates. By implementing the features related to the riser air chamber section B, the effect of having no obstructions in ash extraction is achieved, and furthermore separated nozzles for fluidization air and start-up air can be provided to enhance efficiency during all phases of operation of the reactor 1. By implementing the features relating to the riser spool pipe section E, easy removal of the riser air chamber section B is made possible, e.g. for maintenance and/or cleaning purposes. Efficiency and proper operation is enabled by the features discussed in relation to the sloped bottoms in the reactor 1, and the air nozzles 36-38 to obtain the first fluidized bed, as these features all increase the directing of inert materials and agglomerates to the riser air chamber section B. Finally, also the features relating to the gas outlet distributor section D improve efficiency and proper operation of the reactor 1, as the sloped gap with high gas velocities avoids settling of inert materials and agglomerates, and furthermore, easy removal can be accomplished for maintenance and/or cleaning purposes.

The present invention has been described above with reference to a number of exemplary embodiments as shown in the drawings. Modifications and alternative implementations of some parts or elements are possible, and are included in the scope of protection as defined in the appended claims.

The invention claimed is:

1. A reactor for producing a synthesis gas from a fuel, comprising
a housing with a combustion part accommodating a first fluidized bed in operation, a riser extending along a longitudinal direction of the reactor and accommodating a second fluidized bed in operation,
a down-comer positioned parallel to the riser and extending into the first fluidized bed, and
one or more feed channels for providing the fuel to the reactor, wherein the reactor further comprises
a riser air chamber section connected to a lower part of the riser, the riser air chamber section comprising a cylindrical wall with a plurality of circumferentially located holes.

2. The reactor according to claim 1, wherein the riser air chamber section comprises two sections of nozzle holes, an upper section with a first plurality of holes, and a lower section with a second plurality of holes, wherein a total aperture surface of the second plurality of holes is larger than a total surface aperture of the first plurality of holes.

3. The reactor according to claim 2, wherein a fluidization air chamber is provided in communication with the first plurality of holes.

4. The reactor according to claim 2, wherein a start-up air chamber is provided in communication with the second plurality of holes.

5. The reactor according to claim 1, wherein the riser air chamber section further comprises compressible material attached to an outside surface thereof.

6. The reactor according to claim 1, wherein the reactor further comprises a riser spool pipe section connected to a bottom part of the riser air chamber section.

7. The reactor according to claim 6, wherein the riser air chamber section comprises an upper mounting flange for connection to the housing, and a lower mounting flange for connection to a corresponding mounting flange of the riser spool pipe section,
wherein a height of the cylindrical wall extending above the upper mounting flange is equal to or lower than a height of the riser spool pipe section.

8. The reactor according to claim 1, the housing comprising a first sloped bottom of the first fluidized bed, and a second sloped bottom in a transport zone connecting the first fluidized bed and the second fluidized bed through a transport aperture in the riser,
further comprising multiple groups of air nozzles on the first sloped bottom and the second sloped bottom, the multiple groups of air nozzles being arranged to direct air along the respective first and second sloped bottom.

9. The reactor according to claim 8, wherein the multiple groups of air nozzles comprises a first group of air nozzles on the first sloped bottom, of which nozzle flows are directed at the centre of the reactor.

10. The reactor according to claim 8, wherein the multiple groups of air nozzles comprises a second group of air nozzles on the first sloped bottom, of which nozzle flows are directed at the transport zone.

11. The reactor according to claim 8, wherein the multiple groups of air nozzles comprises a third group of air nozzles on the second sloped bottom, of which nozzle flows are directed at the transport aperture in the riser.

12. The reactor according to claim 8, wherein the first and second sloped bottom have a sloping angle of between 5°-35°, with respect to a cross sectional plane of the reactor.

13. The reactor according to claim 8, wherein the transport aperture in the riser is provided with a cover plate.

14. The reactor according to claim 1, further comprising a gas outlet distributor section, the gas outlet distributor section comprising an inner cone and an outer cone, wherein the inner and outer cone have a different apex opening angle and form an outlet channel with a constant cross section as function of a height of the gas outlet distributor section.

15. The reactor according to claim 14, wherein the housing comprises an inward extending ridge supporting a lower edge of the gas outlet distributor section.

16. The reactor according to claim 14, wherein expansion material is provided on a surface of the outer cone directed at a top part of the housing.

17. The reactor according to claim 14, wherein the inner cone comprises a lifting lug at a top apex of the inner cone.

18. The reactor according to claim 14, wherein the inner cone of the gas outlet distributor section is positioned in the reactor at a predetermined distance from a top edge of the riser.

* * * * *